No. 706,216. Patented Aug. 5, 1902.
J. G. BROWNING.
ROLL HOLDING CAMERA.
(Application filed Mar. 31, 1902.)
(No Model.) 2 Sheets—Sheet 2.
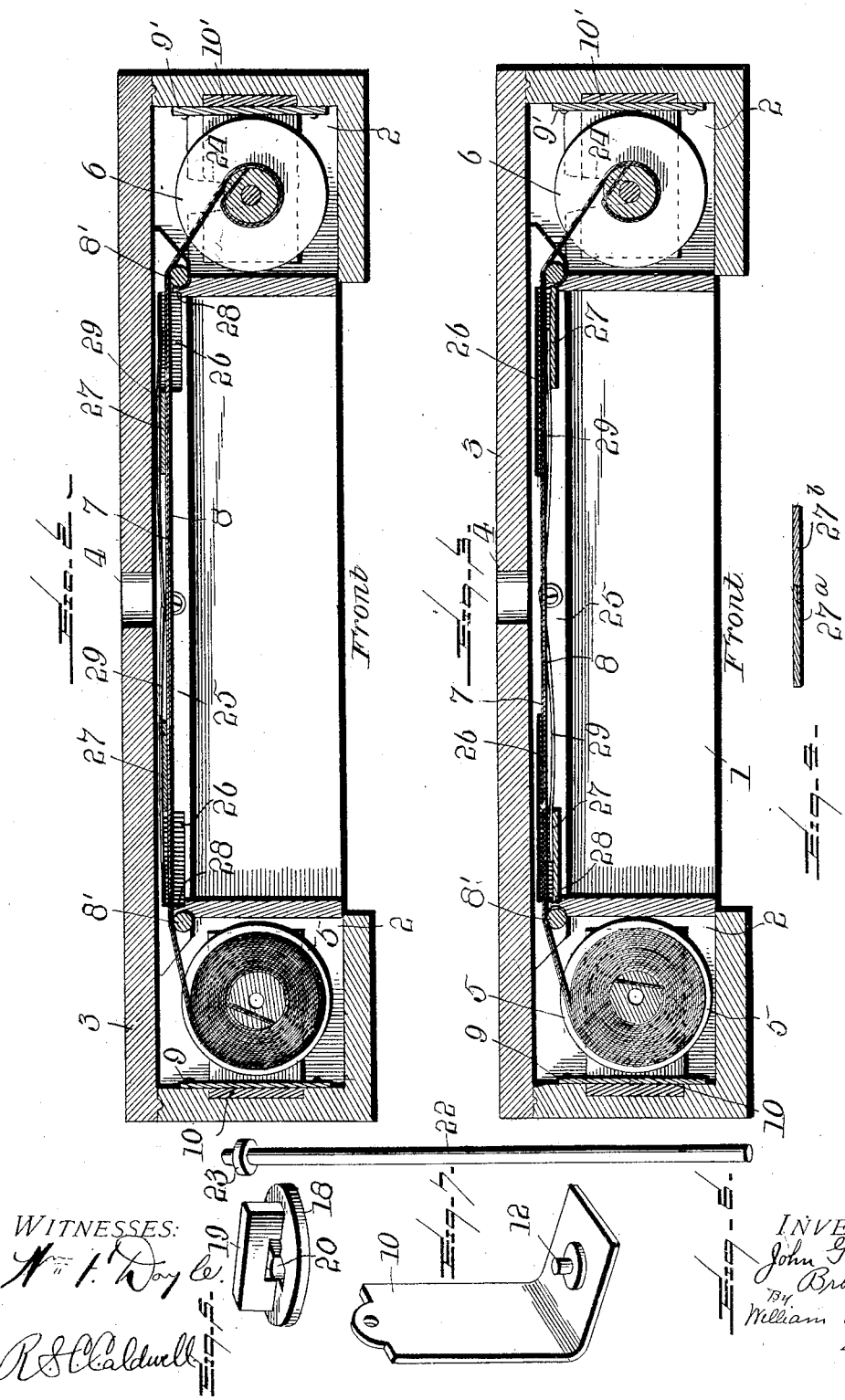
WITNESSES:
INVENTOR
John G. Browning
By William Louden
Attorney

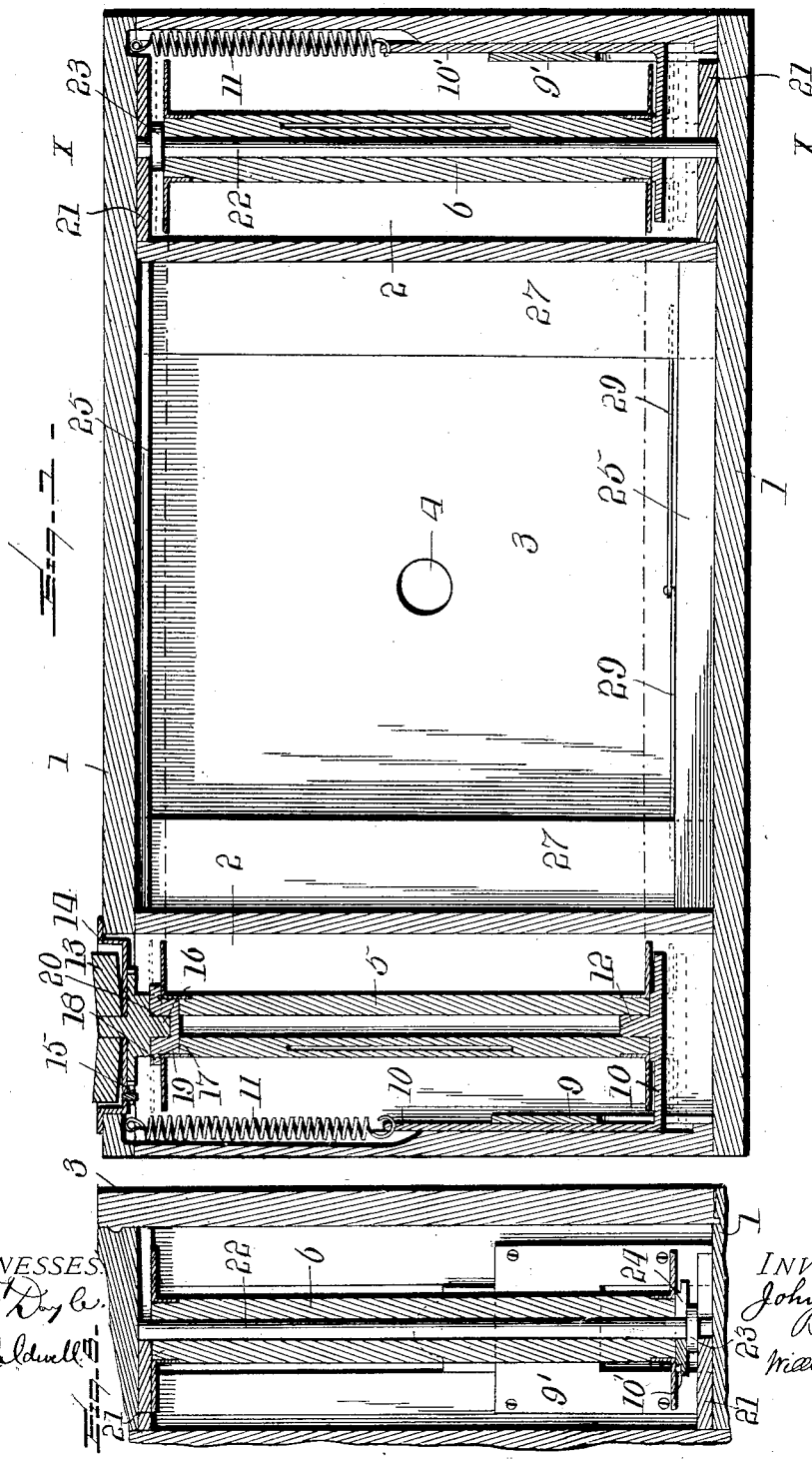

UNITED STATES PATENT OFFICE.

JOHN G. BROWNING, OF FAIRFIELD, IOWA.

ROLL-HOLDING CAMERA.

SPECIFICATION forming part of Letters Patent No. 706,216, dated August 5, 1902.

Application filed March 31, 1902. Serial No. 100,725. (No model.)

*To all whom it may concern:*

Be it known that I, JOHN G. BROWNING, a citizen of the United States, residing at Fairfield, in the county of Jefferson and State of Iowa, have invented certain new and useful Improvements in Roll-Holding Cameras; and I do hereby declare the following to be a full, clear, and exact description of the invention, such as will enable others skilled in the art to which it appertains to make and use the same.

My invention relates to certain new and useful improvements in cameras, and particularly to that class known as "roll-holding" cameras, and has for its object to provide such a camera with means whereby it is adapted to employ films of different sizes.

With the usual form of roll-holding cameras now in general use a film of a certain width is provided for, this film being wound from one spool to another and exposing a definite area of the film at each operation. This area of exposure is always the same, and to enable the operator to know when the film has been moved the required distance to withdraw the last exposed area and present a new area to the range of light without overlaping exposures or wasting film therebetween the film is removably attached to an opaque backing which is wound therewith and contains marks on its back to register with and be seen through a small perforation in the back of the camera-body when any predetermined area of the film is in proper position for exposure. It is obvious that with such a camera the operator is confined to the use of a film of one size only, and while it may be desirable to employ a smaller-size film for convenience or economy this is made impossible, since the mechanical structure of the roll-holding devices will not permit in some instances and in others would throw the film to one side of the field of exposure, and, further, as the length of the area of exposure remains constant and being greater than the length for which the smaller film is designed the successive exposures would overlap each other.

It is the object of my invention to provide roll-holding means adapted to operate rolls of different sizes and at the same time retain the film in the center of the area of exposure.

It is my further object to provide adjustable shields adapted to mask the ends of the area of exposure when the smaller-size films are used to reduce the area of exposure to the proper size for the film.

With the above and other objects in view my invention further consists in the novel details of construction and combination of parts to be clearly described in the following specification and fully set forth in the claims.

Referring to the accompanying drawings, forming a part of this specification, and in which like characters of reference indicate similar parts throughout the several views, Figure 1 is a sectional elevation looking to the rear of the back part of a camera embodying my invention and showing the smaller-size film-spools in place with the position of the larger-size spools shown by dotted lines. Fig. 2 is a longitudinal section thereof, showing the shields in position for exposing a full-size film. Fig. 3 is a view similar to Fig. 2, but showing the shields in position for exposing a film of smaller size. Fig. 4 is a sectional view of a modified form of shield. Fig. 5 is a perspective view of the removable key-hub. Fig. 6 is a perspective view of the spindle. Fig. 7 is a perspective view of a sliding bracket, and Fig. 8 is a transverse section taken on the line *x x* of Fig. 1 and showing a large spool mounted on the spindle.

In the drawings, 1 represents the body portion of the rear part of a camera having the usual end compartments 2 on either side of the field of exposure to contain the film-spools and the removable back 3 with tongue-and-groove connection with the body 1 and the sight-hole 4 in its center. A pair of film-spools 5 and 6 are mounted to rotate in the compartments 2 and their film 8 with its backing 7 extend across the intervening space, which is termed the "field of exposure," and are adapted to be wound from one spool onto the other, the spool 5 being the receiving-spool and spool 6 being the delivering-spool. To prevent the film being scratched in its passage over the edges of compartments 2, friction-rollers 8' are provided at these edges.

Slidable in a groove of the body 1 and confined by a plate 9 is an angular bracket 10, retracted by a spiral spring 11, entrenched in a groove of the body and connected thereto. The free arm of the bracket 10 carries an inwardly-projecting trunnion 12, on which one end of the spool 5 is mounted to rotate by seating the trunnion in its central bore. At the other end of this compartment is the usual thumb-nut 13, countersunk in its socket-plate 14 and provided with the pawl and ratchet 15 to prevent turning the film backward, and also provided with the projecting flange 16. With the large-size spool the flange 16 is seated in the usual slot 17 at one end of the spool; but with the smaller-size spool a removable hub 18 has its flange 19 seated in the slot 17 of said spool and the socket 20 of the hub fits over the flange 16 of the thumb-nut 13.

In the other compartment 2 there is a plate 21 at each end provided with an open bearing to receive the ends of a spindle 22. This spindle 22 is provided with an annular shoulder 23 near one end and is adapted to be placed through the bore of spool 6, with one end of the spool bearing on the shoulder. At its other end the spool 6 is engaged by a spring-actuated sliding bracket 10', similar in all respects to bracket 10, except that instead of the trunnion 12 it has a side slot 24, through which the spindle 22 passes in moving to its bearings. With the full-size spool the shoulder 23 of the spindle 22 is located outside of the bracket 10', as shown in Fig. 8; but with the smaller-size spool the spindle 22 is reversed, so that its shoulder is pressed against by one end of the spool, as shown in Fig. 1.

On the inside of the top and bottom of the body 1 are secured strips 25 in alinement with the path of the film and provided with slots 26 at each end, these slots being of greater width at their outer ends. Thin shields 27 extend from one strip 25 to the other and are loosely seated in the slots 26, so as to be capable of moving therein, that the shields may be brought to a position in front of the film and seated in rabbets 28 in the edges of compartments 2, where they will protect the parts of the film behind them from exposure, as shown in Fig. 3, or they may be placed behind the film, as shown in Fig. 2, when the full-size exposure may be made without interference by shields 27. To retain the shields in whatever position they may be placed, a light spring 29 is provided, which is secured to a strip 25 clear of the edge of the film and presses the shields forward with its ends.

With the construction as now described it will be seen that the camera is threaded by placing the spool 6, containing the film, on the spindle 22 and mounting it in its bearings, as shown in Fig. 8, when the full-size film is used. The backing, and later the film, passes from spool 6 over the rollers 8' in front of the shields 27, which are in the rear portions of the slots 26, and then around spool 5, which is mounted in place without the use of the hub 18. An exposure with the parts in this condition will cover the full field for which the camera is designed. When, however, it is desired to employ a smaller film, the smaller spool 6, containing the film, is mounted on spindle 22, with its end bearing against shoulder 23, as shown in Fig. 1, and the hub 18 is first placed in position before mounting the small spool 5. By means of the shoulder 23 and the hub 18 the film of the smaller-size spool is kept in the center of the field of exposure, and the shields located in front of the film shorten the length of the section of film exposed, so that the numbers on the backing indicate the proper position of the film for exposure when appearing through perforation 4.

It is obvious that while I have described means for permitting the use of one smaller size of film than that for which the camera is designed my invention is not limited thereto. For instance, the shields may be made in sections, as shown in Fig. 4, where the two members 27$^a$ and 27$^b$ have their meeting edges overlapping each other, and either one may be used alone or both jointly. Further, I do not wish to confine myself to the particular details of construction, as many changes therein may be resorted to without departing from the spirit or scope of my invention, such as hinging the shields at their ends, so as to be capable of having the film threaded above or beneath.

Having fully described my invention in detail, what I claim as new, and desire to secure by Letters Patent, is—

1. In a roll-holding camera, a spool-holding device adapted to receive spools of different lengths in combination with means adjustable within the body of the camera for shielding a part of the field of exposure of the camera.

2. In a roll-holding camera, a shield located at each end of the field of exposure and adapted to be adjusted to the front of the film or to the rear thereof, and means for holding said shields in their different places of adjustment.

3. In a roll-holding camera, a roll-holding device comprising a suitably-journaled spindle provided with a shoulder and a spring-actuated bracket adapted to press a spool against the shoulder of the spindle for one size spool and adapted to press a spool against the bearing of the spindle with the shoulder of said spindle at its rear for a larger-size spool, substantially as described.

4. In a roll-holding camera, a spool-holding device comprising a rotatable thumb-nut, a pawl-and-ratchet mechanism mounted thereon, a flange on the thumb-nut to fit the spool-slot for a large-size spool, a spring-actuated bracket having a trunnion on which a spool may be mounted, and a removable hub having a socket to fit over the flange on the thumb-nut and a flange to fit in the spool-slot for a small-size spool, substantially as described.

5. In a roll-holding camera, a spool-holding device comprising a suitably-journaled spindle provided with a shoulder and a spring-actuated bracket adapted to press a spool against the shoulder of the spindle for one size spool and adapted to press a spool against the bearing of the spindle with the shoulder of said spindle at its rear for a larger-size spool, a rotatable thumb-nut, a pawl-and-ratchet mechanism mounted thereon, a flange on the thumb-nut, to fit the spool-slot for a large-size spool, a spring-actuated bracket having a trunnion on which a spool may be mounted, and a removable hub having a socket to fit over the flange on the thumb-nut and a flange to fit in the spool-slot for a small-size spool, substantially as described.

6. In a roll-holding camera, means adjustable within the body thereof adapted to be placed in front of the film or to the rear of said film whereby a full-sized exposure may be made or a reduced-sized exposure made, substantially as described.

7. In a roll-holding camera, a shield located at each end of the field of exposure and adapted to be adjusted to the front of the film or to the rear thereof.

8. In a roll-holding camera a shield mounted in slots in the frame of the camera at each end of the field of exposure thereof said slots being wider at their outer ends, the shields being adapted to lie in the front of the film when in the wider portions of the slots and to lie behind the film when in the narrow portions of said slots.

In testimony whereof I affix my signature in presence of two witnesses.

JOHN G. BROWNING.

Witnesses:
  J. W. CASSEL,
  C. P. HOGUE.